No. 878,370. PATENTED FEB. 4, 1908.
J. FISCHER.
APPARATUS FOR THE CHEMICAL PURIFICATION OF OILS AND THE LIKE.
APPLICATION FILED JULY 31, 1905.

WITNESSES:
Fannie Fisk

INVENTOR
Josef Fischer
BY
ATTORNEYS.

UNITED STATES PATENT OFFICE.

JOSEF FISCHER, OF VIENNA, AUSTRIA-HUNGARY.

APPARATUS FOR THE CHEMICAL PURIFICATION OF OILS AND THE LIKE.

No. 878,370.        Specification of Letters Patent.        Patented Feb. 4, 1908.

Application filed July 31, 1905. Serial No. 271,932.

*To all whom it may concern:*

Be it known that I, JOSEF FISCHER, a subject of the Emperor of Austria-Hungary, residing in Vienna, Austria-Hungary, have invented certain new and useful Improvements in Apparatus for the Chemical Purification of Oils and the Like, of which the following is a specification.

This invention relates to an improved apparatus for the chemical purification of oils, such as benzin, petroleum, lubricating oils and the like, said apparatus being capable of continuous operation and treatment of the oils with any one of the known purifying substances, such as sulfuric acid, soda lye and the like. The oil to be purified is conducted in the apparatus through the purifying medium from the lower part to the upper part and passes through the purifying medium for the minute distribution of the oil through a number of superposed screens or perforated partitions.

The new feature of the apparatus consists in arranging the screens of perforated partitions with a circumferential upwardly extending rim, which is raised above the level of the purifying liquid column, whereby the purifying vessels are so arranged that the screens are inserted telescopically one within the other. By this arrangement the tight fitting of the screens or walls from the wall of the purifying vessel proper is dispensed with, the escape of unused portions of the purifying medium prevented, and the easy removal and cleaning of the distributing devices rendered possible.

Figure 1:
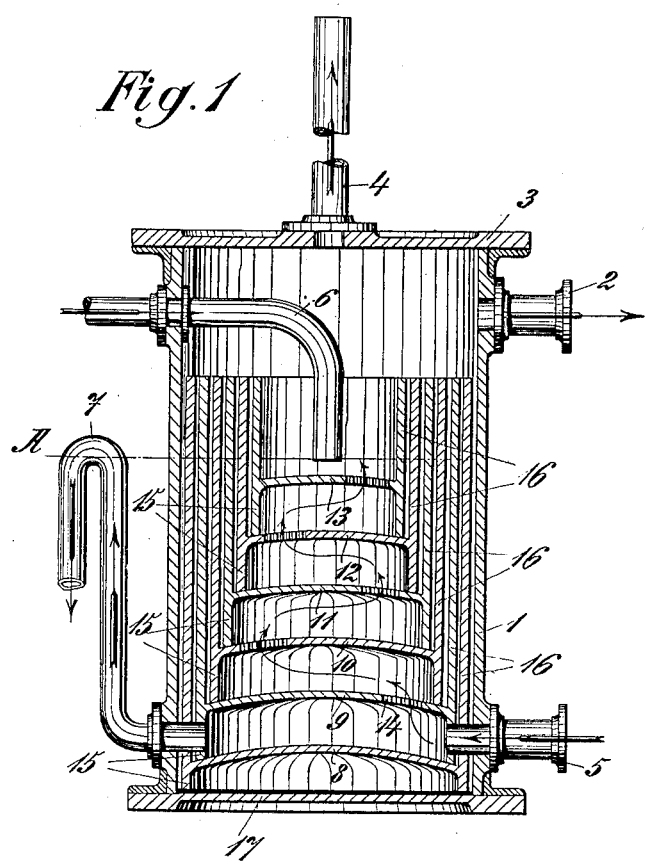
Figure 2:
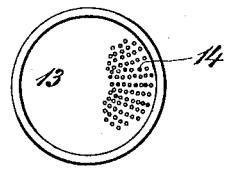
Figure 3:
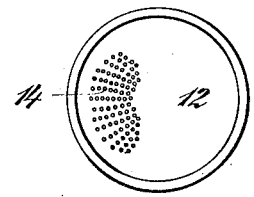

In the accompanying drawing, Figure 1 is a vertical central section of my improved apparatus for the chemical purification of oils and Figs. 2 and 3 are detail plan views of the two uppermost distributers provided with perforated walls.

Similar reference characters indicate corresponding parts.

The apparatus comprises a vessel 1, which is preferably made of circular cross-section, and provided at the upper end with a discharge-tube 2 for the purified oil. The vessel 1 is closed by a cover 3, which is provided with a pipe 4 for conducting off the gas or vapors generated in the vessel 1. The upper open end of the pipe 4 terminates above the level of the tank which contains the oil to be purified. The oil to be purified is supplied from the tank through a supply-pipe 5 arranged at the lower part of the vessel, continuously into the latter, and is discharged through the pipe 2 at the upper end of the same. The liquid purifying medium runs continuously through a bent pipe 6 located at the upper part of the vessel 1, through the same, and leaves through a gooseneck pipe 7 arranged at the lower part of the same.

In the vessel 1 is arranged any suitable number of horizontal walls 8, 9, 10, 11, 12 and 13, whose diameters gradually diminish from the lower partition-wall towards the upper one, so that the partition 8 is the largest and the partition 13 the smallest. The walls 9, 10, 11, 12 and 13 are provided with holes 14, which are preferably staggered relatively to the perforations of the adjacent partitions. Each one of the walls 8 to 13 is provided with a downwardly bent circumferential flange 15 and an upwardly extending continuation 16 of the same. The two flanges of each perforated wall form a cylindrical body which is divided by the perforated partition-wall into a lower smaller and an upper larger space. The holes 14 are so arranged that they are always located within the circumferential flange 15 of the next higher partition. The flange 15 of the lowermost partition-wall 8 rests on the bottom 17 of the vessel 1, while the flange 15 of the remaining perforated wall rests on the circumference of the next lower wall, so that the perforated walls are at a distance from each other corresponding to the height of the flange 15. In this manner the cylinders which are formed by the two flanges 15, 16, of each perforated partition-wall are arranged telescopically one within the other. The circumferential flange 16 is highest for the lowest partition-wall and is gradually diminished with the other partition-walls for the height of the flange 15, plus the thickness of the wall, so that the upper edges of the flanges 16 are in one plane and extend above the level of the column of purifying liquid.

At the beginning of the operation the vessel 1 has to be filled up to the height of the gooseneck pipe 7 with the purifying medium, so that the same is on a uniform level in all the cylinders formed by the flanges 16.

The purifying medium is supplied continuously through the bent pipe 6 into the space inclosed by the flange 16 of the uppermost partition-wall 13, and then passes within the cylinders through the perforations 14 in a serpentine course in downward direction, while simultaneously the oil which is continuously supplied to the space between the walls 8 and 9 is conducted in the same course through the perforations 14 in an upward direction in a current opposite to that of the purifying medium. The escape of oil between two adjacent cylinders is prevented by the arrangement of the holes 14 hereinbefore described. It is preferable to make the perforated walls slightly convex, so that in the angle formed between the flanges 15 and each wall a liquid seal is formed for the oil by the purifying liquid.

Having thus described my invention, I claim as new and desire to secure by Letters Patent:

1. An apparatus for the chemical purification of oils, comprising a vessel provided with a supply-pipe at the upper part and a gooseneck pipe at the lower part for the purifying liquid, a supply-pipe at the lower and a discharge-pipe at the upper end for the oil to be purified, a cover provided with an outlet-pipe for the escape of the gases, and a number of superposed perforated partitions or screens provided with downwardly extending circumferential flanges and upwardly extending cylinders in line therewith which form a cylindrical mantle for each wall, which are placed telescopically one within the other.

2. An apparatus for the chemical purification of oils, comprising a purifying vessel and a number of interior perforated partition-walls of gradually diminishing diameter, and provided with downwardly extending flanges and upwardly extending cylinders in line with said flanges.

3. An apparatus for the chemical purification of oils, comprising a purifying vessel, and a number of interior perforated partition-walls provided with downwardly extending flanges and cylindrical extensions in line therewith, said partition-walls being made with gradually diminishing diameter and provided with perforations within the flanges of the next adjacent partition-walls, the flanges of the cylinders being located telescopically one within the other, and the upper ends being arranged at the same level.

In testimony that I claim the foregoing as my invention, I have signed my name in presence of two subscribing witnesses.

JOSEF FISCHER.

Witnesses:
 ALFRED KLOP,
 ALVESTO S. HOGUE.